(12) United States Patent
Levi et al.

(10) Patent No.: US 10,091,311 B2
(45) Date of Patent: Oct. 2, 2018

(54) SMART LOCATION DETERMINATION

(71) Applicant: HEWLETT PACKARD ENTERPRISE DEVELOPMENT LP, Houston, TX (US)

(72) Inventors: Elad Levi, Rehovot (IL); Avigad Mizrahi, Jerusalem (IL); Ran Bar Zik, Petah Tiqwa (IL)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 15/524,473

(22) PCT Filed: Nov. 4, 2014

(86) PCT No.: PCT/US2014/063813
§ 371 (c)(1),
(2) Date: May 4, 2017

(87) PCT Pub. No.: WO2016/072970
PCT Pub. Date: May 12, 2016

(65) Prior Publication Data
US 2017/0318100 A1 Nov. 2, 2017

(51) Int. Cl.
*H04W 24/00* (2009.01)
*H04L 29/08* (2006.01)
(Continued)

(52) U.S. Cl.
CPC .......... *H04L 67/18* (2013.01); *H04L 61/2007* (2013.01); *H04L 63/107* (2013.01);
(Continued)

(58) Field of Classification Search
CPC ... H04L 67/18; H04L 61/2007; H04L 63/107; H04L 67/02; H04L 67/306; H04L 61/609; H04W 4/00
(Continued)

(56) References Cited

U.S. PATENT DOCUMENTS 7,257,570 B2    8/2007  Riise et al.
7,685,279 B2 *  3/2010  Miltonberger .......... G07F 17/32
                                                    370/242
(Continued)

FOREIGN PATENT DOCUMENTS

KR      20050019694 A    3/2005
WO      WO-2013024986 A2 2/2013

OTHER PUBLICATIONS

Andrei Popescu, Geolocation API Specification, W3C Recommendation, Oct. 24, 2013, Retrieved Oct. 20, 2014, 9 Pages.
(Continued)

*Primary Examiner* — Marceau Milord

(57) ABSTRACT

In one example in accordance with the present disclosure, a system for smart location determination includes a session information accessor to access session information that details a session of a user system as it connects to a web technology server. The system includes a knowledge base that includes known common session information of multiple geographic locations. The system includes a session information comparator to compare the accessed session information to the knowledge base, and based on the comparison, determine a geographic location of the user system or verify an alleged geographic location.

17 Claims, 4 Drawing Sheets

(51) Int. Cl.
*H04L 29/06* (2006.01)
*H04L 29/12* (2006.01)
*H04W 4/02* (2018.01)

(52) U.S. Cl.
CPC ............ *H04L 67/02* (2013.01); *H04L 67/306* (2013.01); *H04W 4/02* (2013.01); *H04L 61/609* (2013.01)

(58) Field of Classification Search
USPC ............. 455/456.1, 456.2, 404.2, 456.5, 457
See application file for complete search history.

(56) References Cited

U.S. PATENT DOCUMENTS

| | | | |
|---|---|---|---|
| 8,385,964 B2 * | 2/2013 | Haney | H04W 4/08 455/404.1 |
| 8,463,942 B2 | 6/2013 | Parekh et al. | |
| 8,527,633 B2 * | 9/2013 | Bade | G06F 8/61 709/225 |
| 8,566,589 B1 | 10/2013 | Satish et al. | |
| 8,676,637 B2 * | 3/2014 | Aaron | G06Q 30/02 705/14.26 |
| 9,021,080 B2 * | 4/2015 | Anderson | H04L 29/12009 709/220 |
| 9,374,369 B2 * | 6/2016 | Mahaffey | H04L 63/083 |
| 9,386,120 B2 * | 7/2016 | Borzycki | G06F 21/6218 |
| 9,609,619 B2 * | 3/2017 | Woodcock, IV | H04W 64/003 |
| 9,654,921 B1 * | 5/2017 | Haney | H04W 4/02 |
| 9,720,555 B2 * | 8/2017 | Sorden | G06F 3/048 |
| 9,779,253 B2 * | 10/2017 | Mahaffey | G06F 21/577 |
| 9,781,148 B2 * | 10/2017 | Mahaffey | H04L 63/1433 |
| 2005/0154904 A1 | 7/2005 | Perepa et al. | |
| 2006/0010252 A1 | 1/2006 | Miltonberger et al. | |
| 2007/0256122 A1 | 11/2007 | Foo et al. | |
| 2008/0052413 A1 | 2/2008 | Wang et al. | |
| 2008/0065774 A1 | 3/2008 | Keeler | |
| 2010/0125663 A1 | 5/2010 | Donovan et al. | |
| 2012/0036576 A1 | 2/2012 | Iyer et al. | |
| 2013/0091452 A1 * | 4/2013 | Sorden | G06F 3/048 715/771 |
| 2014/0032691 A1 * | 1/2014 | Barton | H04L 41/00 709/206 |
| 2014/0032759 A1 * | 1/2014 | Barton | H04L 67/10 709/225 |
| 2014/0068767 A1 | 3/2014 | Mao et al. | |
| 2014/0335886 A1 * | 11/2014 | Kim | H04L 67/18 455/456.1 |
| 2014/0337930 A1 * | 11/2014 | Hoyos | H04L 63/10 726/4 |

OTHER PUBLICATIONS

International Search Report & Written Opinion received in PCT Application No. PCT/US2014/063813, dated Jul. 16, 2015, 12 pages.

Khairo, M.O., "Mobile Data Mining-Based Services on the Base of Mobile Device Management (MDM) System," vol. 5 No. 3, 6 pages, http://file.scirp.org/Html/3-3400351_48308.

McAfee, "Identifying and Thwarting Malicious Intrusions," (Research Paper), White Paper, 2010, 14 pages, http://www.locked.com/sites/default/files/identifying-ma.

Voxeo, "Location-based Services Overview", accessed Oct. 20, 2014, 6 pages, http://help.voxeo.com/browser?REQ=H&FU=STOPIC&DKEY=BT1324645079142&DFOLDER=BOOK%2B%2B%2B%2B1.

* cited by examiner

SMART LOCATION DETERMINATION

BACKGROUND

It may be desirable or required for a web technology (e.g., a webpage, web application, mobile application, etc.) to determine the location (e.g., geographic location, nationality, etc.) of a user (i.e., end user) of the web technology. For example, a content publisher or a government may impose a legal restriction on particular users (e.g., users outside of a particular country) accessing particular content (sometimes referred to as Geo Blocking). As another example, some web technologies offer tailored content or advertisements to users based on the location of the user.

BRIEF DESCRIPTION OF THE DRAWINGS

The following detailed description references the drawings, wherein.

DETAILED DESCRIPTION

As explained above, it may be desirable or required for a web technology (e.g., a webpage, web application, mobile application, etc.) to determine the location (e.g., geographic location, nationality, etc.) of a user (i.e., end user) of the web technology. In some situations, the location of a user may be determined based on the IP (internet protocol) address of the user's device or by analyzing other aspects of the user's network connection. Such methods of determining user location may be inaccurate because, among other reasons, a user may "spoof" (i.e., falsely fabricate) or hide their IP address. For example, tools such as VPNs (virtual private network) and proxy servers allow users to route their connection through an intermediary before connecting to an end destination. The numbers of users that employ such tools is on a significant rise. Thus, various methods of determining a user's location are becoming less and less accurate.

The present disclosure describes smart location determination. The present disclosure describes determining a location (e.g., geographic location) of a user system, wherein the location may be determined with accuracy despite a spoofed or hidden IP address. The present disclosure describes comparing session information (that details a session of the user system as it sends a request to a web technology server) to known session information of multiple geographic locations. Based on the comparison, a "real" or spoof-proof location of the user system may be determined or an alleged location (e.g., from an alleged IP address) may be verified.

Figure 1:
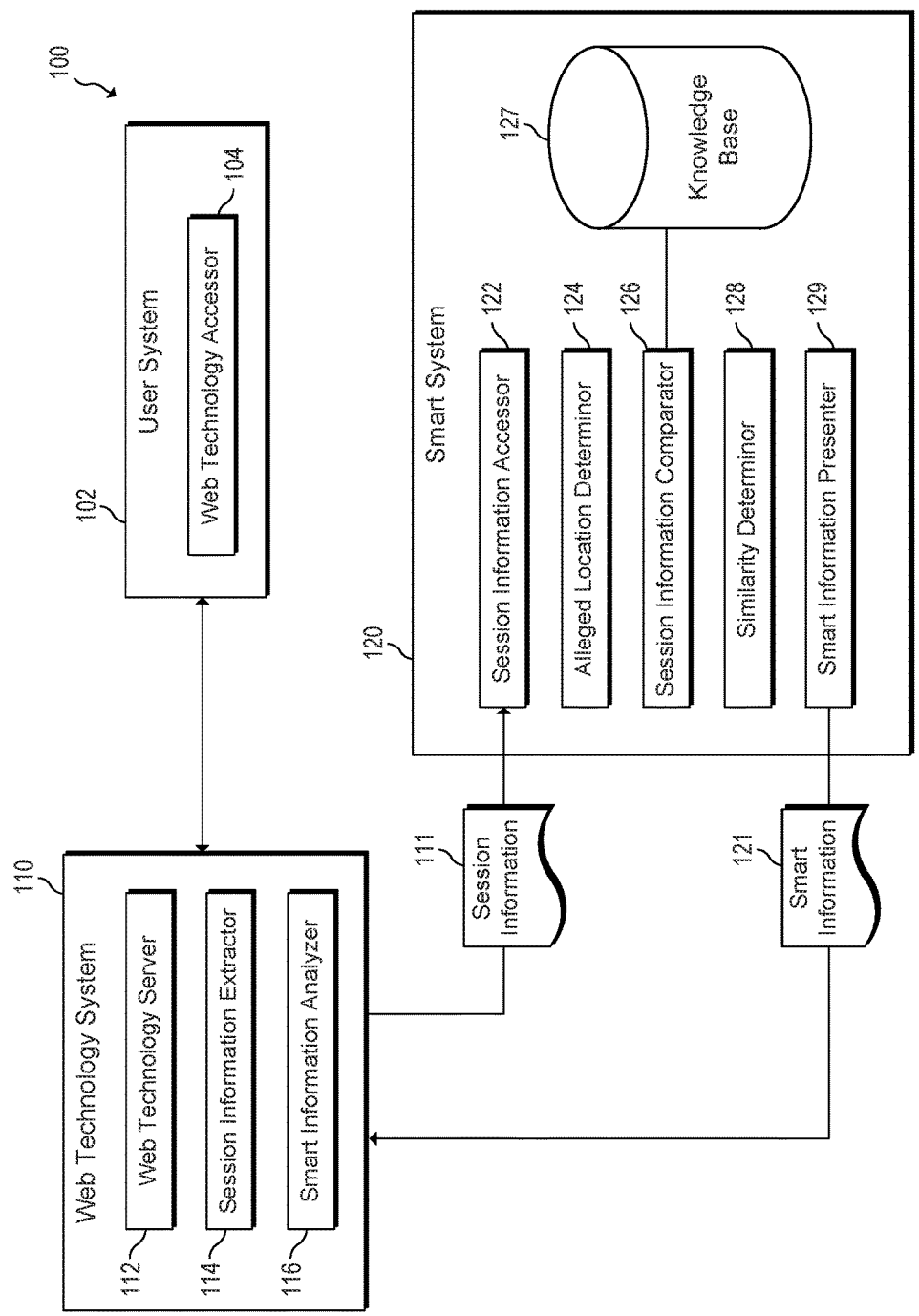
FIG. 1 is a block diagram of an example computing environment in which smart location determination may be useful.

FIG. 1 is a block diagram of an example computing environment 100 in which smart location determination may be useful. Computing environment 100 may include a user system 102, a web technology system 110 and a smart system 120. User system 120 may communicate (e.g., over a network) with web technology system 110, for example, to access a web technology. Web technology system 110 may host the web technology for various user systems (e.g., 102) and may extract session information that details sessions of user systems (e.g., 102) as they connect to the web technology. For a particular connection between a user system (e.g., 102) and the web technology, web technology system 110 may send (e.g., over a network) certain session information (e.g., 111) to smart system 120. Smart system 120 may analyze the session information to determine a geographic location of the user system (e.g., 102) or to verify an alleged geographic location (e.g., one indicated by the user system's IP address). The above mentioned networks, which in some examples may be the same network, may each be any wired or wireless network, and may include any number of hubs, routers, switches, cell towers or the like. Such networks may each be, for example, part of a cellular network, part of the internet, part of an intranet and/or other type of network.

User system 102 may include at least one computing device that is capable of communicating with at least one remote system (e.g., 110) over a network. User system 102 may include a web technology accessor 104. Web technology accessor 104 may access a web technology on a remote system (e.g., 110). More specifically, web technology accessor 104 may issue requests (e.g., HTTP requests) to the remote system and may receive data in return that is used to present the web technology on the user system and allows a user of the user system to interact with the web technology. In some examples, web technology accessor 104 may be a web browser, and the web technology (hosted on system 110) may be a webpage. In other examples, web technology accessor 104 may be a mobile application, and the web technology may be mobile application server-side code. This disclosure contemplates various other examples of web technology accesssors and web technologies.

Web technology system 110 may include at least one computing device that is capable of communicating with at least one user system (e.g., 102) over a network. The term "system" may be used to refer to a single computing device or multiple computing devices that communicate with each other (e.g., via a network) and operate together to provide a unified service. Web technology system 110 may store (or "host") code for a web technology, for example, an interactive webpage or website, a mobile application or the like. Web technology system 110 may receive requests from user systems (e.g., 102) to interact with the web technology, and in response may return data to the user systems. Web technology system 110 may include a web technology server 112, a session information extractor 114 and a smart information analyzer 116. Each of these components may each include instructions (e.g., stored on a machine-readable storage medium of system 110) that, when executed (e.g., by a processor of system 110), implement the functionality of the component. Alternatively or in addition, each of these components may include electronic circuitry (i.e., hardware) that implements the functionality of the component.

Web technology server 112 may provide or "serve" the web technology to requesting user systems (e.g., 102). Web technology server 112 may receive requests from the user systems, may access the code for the web technology and may return data to the requesting user systems.

Session information extractor 114 may analyze requests from user systems (e.g., 102) received by the web technology system 110 to access the web technology. A particular request may include several pieces of information. For example, a request may include the IP address of the requesting device. As mentioned above, this IP address may in some situations be spoofed or hidden. The request may also include session information. The term "session information" may be used throughout this disclosure to refer to information that details a session of a user system (e.g., 102) as it connects to a web technology server (e.g., 112). Session information may include both system information of the user system and information about the web technology accessor (e.g., a web browser). System information may include details about the physical (e.g., hardware) aspects of the user system and software (e.g., operating system) aspects of the user system. Information about the web technology accessor may include details about the version of the accessor, language of the accessor, plugins running with the accessor and the like. In some examples, the IP address of the requesting device may be considered as part of the session information. However, in various descriptions herein, the IP address may be considered as separate so that a distinction can be made between the IP address and other session information.

The following description details several examples of pieces of session information for the purposes of illustrating that session information can refer to a broad range of information. Each piece of session information may also be referred to as a parameter or "session parameter." One example parameter is the request header (e.g., HTTP request header), which may include multiple fields, each with a valuable piece of information about the session. Another example is the Accept-Language header, which includes information about the user's language preferences. Another example is the version of a particular plugin (e.g., Java Applet). Another example is the operating system version of the user system. Another example is the version of the web technology accessor (e.g., the version of a web browser). In the example of web browsers, session information may indicate both a major web browser version and a minor web browser version. Another example of a session parameter is the version of particular software running on the user system, for example, the Flash player version. Another example is details about the configuration of the user system, e.g., user screen resolution. Session information may refer to many other types of information, and the descriptions include herein contemplate various other types of session information.

As one specific example, session information may be extracted from a user agent string. Various web technology accessors (e.g., web browsers, web applicatinos, etc.) may maintain a user agent string to accumulate many useful pieces of session information in a single place. In some examples, when a web technology accessor maintains a user agent string, it may send this string as part of the request when the web technology accessor (e.g., 104) accesses a web technology (e.g., on system 110). Thus, in some examples, session information extractor 114 may analyze a request, identify a user agent string included in the request, and further analyze the user agent string to extract session information (including multiple session parameters).

Session information extractor 114 may select a number of the available session parameters to send to smart system 120. For example, a subset of the available session parameters may be determined (e.g., by a developer of the web technology) as important to the location determinations to be performed by smart system 120. Session information extractor 114 may also assign an importance rating to at least one of the selected session parameters, and in some examples, to all of the selected session parameters. For example, using these importance ratings, a developer could indicate that the "browser language" parameter is very important, while the "operating system language" is less important. Various ratings scales (e.g., X/10 where X is an integer) maybe used to indicate importance.

Session information extractor 114 may also assign an importance rating to the IP address (i.e., the alleged IP address) of the request. For example, the developer could indicate that the IP address is not relevant at all to the location determinations to be made by smart system 120.

The session parameters selected by session information extractor 114 may form a sort of "digital fingerprint" of a particular session. The importance ratings of the various parameters may, in some examples, also be part of the digital fingerprint. In the present disclosure, the digital fingerprint does not include the IP address, even though the IP address may be sent by the web technology system 110 to smart system 120. A digital fingerprint may be a calculated value or code based on selected session parameters. Alternatively, the term digital fingerprint may just be a term used to refer to the configuration of selected session parameters and perhaps their corresponding importance ratings.

Session information extractor 114 may send session information (e.g., 111) for a particular session to smart system 120. Session information extractor 114 may send all available session parameters or only selected parameters. Session information extractor 114 may also send importance ratings for at least one of the selected session parameters. Session information extractor 114 may send raw session parameters or it may compute a digital signature value or code and send that instead. Likewise, if importance ratings are used, session information extractor 114 may send raw session parameters and associated importance ratings or it may compute a digital signature value or code that accounts for importance ratings and send that instead. Session information extractor 114 may also send the IP address (i.e., the alleged IP address) of the request.

Smart information analyzer 116 may analyze smart information (e.g., 121) that is sent back from smart system 120. As explain in more detail below, smart information 121 may include, among other things, a location (e.g., geographic location) related to the particular user session for which session information (e.g., 111) was sent to smart system 120. This location may be accurate even if a user of user system 102 has spoofed or hidden their IP address. Thus, this location may be referred to as a "real" or "spoof-proof" location. The web technology system may use this smart information for various purposes, e.g., in line with desires or requirements of content publishers or governments. As one example, the web technology or other program of the web technology system may analyze and use the smart information in an automated manner. As another example, a developer of the web technology may manually review the received information.

Smart system 120 may include at least one computing device that is capable of communicating with at least one web technology system (e.g., 110) over a network. The term "system" may be used to refer to a single computing device or multiple computing devices that communicate with each other (e.g., via a network) and operate together to provide a unified service. Smart system 120 may receive session information (e.g., 111) from web technology system 110 and may analyze this information to determine a "real" location (e.g., geographic location) of the user system (e.g., 102) or verify an alleged location (e.g., indicated by an IP address). Smart system 120 may return this "real" location and perhaps other data to the web technology system 110 as indicated by smart information 121 of FIG. 1. In some examples, smart system 120 may be a Saas (software as a service) system.

Smart system 120 may include a session information accessor 122, an alleged location determinor 124, a session information comparator 126, a similarity determinor 128 and a smart information presenter 129. Each of these components may each include instructions (e.g., stored on a machine-readable storage medium of system 120) that, when executed (e.g., by a processor of system 120), implement the functionality of the component. Alternatively or in addition, each of these components may include electronic circuitry (i.e., hardware) that implements the functionality of the component.

Session information accessor 122 may access session information that details a session of a user system (e.g., 102) as it connects to a web technology server (e.g., 112). If web technology system 110 is a separate, remote system from smart system 120, session information accessor 122 may receive session information (e.g., 111) from web technology system 110, e.g., over a network. In some examples, web technology system and smart system 120 may be part of the same system, in which case, session information accessor 122 may access the session information directly from session information extractor 114. Session information accessor 122 may also access and/or receive an alleged IP address (or allege location based on the IP address) of the user system 102.

Alleged location determinor 124 may determine an alleged location (e.g., geographic location, country, etc.) of user system 102. For example, this may be a location associated with the alleged IP address of user system 102. Alleged location determinor 124 may use a look-up table or other database to determine a location associated with the alleged IP address. In some examples, web technology system 110 may determine the location associated with the alleged IP address, and may send this alleged location directly to smart system instead of or in conjunction with the alleged IP address. As described above, the IP address of user system 102 may have been spoofed or hidden, but alleged location determinor 124 may use the alleged IP address and/or associated location nonetheless. For example, the alleged location may be given some (even if limited) weight in the process of smart location determination. Additionally or instead, the alleged location may be used to determine whether the alleged location for a particular request is indeed accurate (and to what degree).

Session information comparator 126 may use the session information (or digital fingerprint) accessed by session information accessor 122 to compare to a knowledge base (e.g., 127) to determine a location (e.g., geographic location) of the user system (e.g., 102) or verify an alleged location. Smart system 120 may include a knowledge base 127 that includes, for multiple locations or regions, session information that is common, typical or average for that particular location/region. In other words, knowledge base 127 may maintain a "profile" for each location/region. Knowledge base 127 may be created by harvesting usage or session information from many user systems across many locations/regions. Session information comparator 126 may then compare the accessed session information (e.g., from 122) to the profiles in the knowledge base 127.

The following will describe a number of examples with regard to knowledge base 127 and comparing to knowledge base 127. In one example, a profile may be maintained for the country of Hungary. This profile may include a session parameter for the Accept-Language header indicating a Hungary language preference. This profile may also include a session parameter indicating a specific Java Applet version. This profile may also include a session parameter indicating a specific operating system version (e.g., Windows Vista 32 bit). This profile may also include a session parameter for a specific browser version (e.g., Internet Explorer 9) and a specific Flash player version (e.g., version X). This profile may specify many more (e.g., hundreds more) parameters that are specific to users that originate their connection from Hungary. With this example Hungary profile in mind, if session information comparator 126 receives session information (e.g., for user system 102) and it most closely matches the Hungary profile, and yet the alleged IP address of the user system indicates an Italy location, it can be concluded that the IP address is spoofed. Moreover, the likely "real" location (i.e., Hungary) of the user system can be determined despite the spoofed IP address.

Knowledge base 127 may maintain secondary information for various session parameters as well. For example, if for a particular country (e.g., China) there is a most popular browser (e.g., Internet Explorer 6) and a secondary browser (e.g., Mozilla), knowledge base 127 may store each of these. Then, when session information comparator 126 is attempting to match the received session information to a particular profile, if the received session information indicates usage of a secondary parameter, a match may still be made with a particular profile, for example, if various other session parameters match strongly. In other words, matching to a secondary parameter may be evidence of a profile match, but weaker evidence than a match to a primary parameter.

Knowledge base 127 may include or be in communication with at least one physical storage mechanism (e.g., hard drive, solid state drive, tap drive or the like) capable of storing information including, for example, a digital database, a file capable of storing text, media, code, settings, other data or the like, or other type of data store. Knowledge base 127 may also include executable instructions stored on at least one machine-readable storage medium of system 120 and executed by at least one processor of system 120. Alternatively or in addition, knowledge base 127 may include one or more hardware devices including electronic circuitry for implementing the functionality of the knowledge base (e.g., responding to requests for information, performing lookups, returning data, etc.).

Session information comparator 126 may compare session information to the knowledge base 127 in various ways for various purposes. For example, it may compare in order to verify an alleged location (e.g., from an alleged IP address). In this example, session information comparator 126 may look up the profile of the alleged location from the knowledge base 127 and then compare it to the received session information. As another example, session information comparator 126 may compare in order to discover the "real" (spoof-proof) location based on the received session information. In this example, session information comparator 126 may analyze multiple profiles in the knowledge base 127, comparing each to the received session information, with the goal of finding the profile that most closely matches the received session information (e.g., a country with average usage/session information that most resembles the usage/session information of user system 102).

As another example, session information comparator 126 may compare in order to detect when a proxy is being used. In this example, if after analyzing received session information for multiple user systems, it is detected (based on comparison to the knowledge base) that the user systems are really from various different locations, and yet they all present the same IP address or IP domain, it may be concluded that the IP address or IP domain is a proxy. Known proxies may be stored in smart system 120, for example, such that for these IP addresses or domains, the alleged IP address may be removed from consideration when analyzing future received session information.

Session information comparator 126 may compare to knowledge base 127 by comparing raw session parameters (received session information) to raw session parameters (in knowledge base). Alternatively, session information comparator 126 may compare a digital fingerprint value or code (of received session information) to digital fingerprint values or codes (one for each profile in knowledge base). Whether comparisons are performed on raw session parameters of calculated digital fingerprint values or codes may be a design decision, and web technology system 110, smart system 120 and knowledge base 127 may all abide by the same methodology.

Session information comparator 126 may use importance ratings specified by web technology system 110. As described above, at least one of the session parameters, and in some examples, all of the selected session parameters may include an importance rating when received. Session information comparator 126 may consider these ratings when comparing to profiles in knowledge base 127. For example, a session parameter in the received session information may not match a corresponding session parameter in a profile in knowledge base 127, but if that session parameter was assigned an importance rating of zero, then the mismatch may have no effect on the overall matching.

Similarity determinor 128 may determine similarity ratings associated with various comparisons performed by session information comparator 126. For example, if session information comparator 126 is comparing received session information to a profile associated with an alleged location (e.g., from an alleged IP address), similarity determinor 128 may determine how close the match is (i.e., the similarity rating). As another example, if session information comparator 126 is comparing received session information to multiple profiles in the knowledge based to find a closest match, session information comparator 126 may determine how close the match is for the best match or for all the profile comparisons performed. The similarity rating may take the form of a percentage (e.g., 0% is the worst match possible and 100% is the best match possible) or some other scale of relatedness. Similarity determinor 128 may use the importance ratings of various session parameters when calculating the similarity rating. Thus, for example, if two corresponding parameters do not match, but the importance rating for that parameter is 0%, then the mismatch may have no effect on the similarity rating.

Smart information presenter 129 may send various pieces of information (collectively referred to as smart information 121) back to the web technology system 110 (e.g., to smart information analyzer 116), where, for example, a bundle of smart information 121 may be sent back for each bundle of session information 111 sent to the smart system 120. Smart information 121 may include a "real" (spoof-proof) location associated with the sent session information 111. Smart information 121 may include a similarity rating associated with that real location. Smart information 121 may include an indication of whether an alleged location or IP address of user system 102 is real or has been spoofed. Smart information 121 may include a similarity rating between the alleged location and the real location as determined by session information comparator 126. Smart information 121 may also include the alleged location of an IP address supplied to the smart system 120 if the smart system 120 performs such a determination. In some examples, the alleged location associated with a supplied IP address of user system 102 may be determined by web technology system 110 and in other examples, the allege location may be determined by smart system 120. Smart information 121 may also include an indication of whether an alleged location or IP address is associated with a known proxy.

In some examples, session information comparator 126 may determine and smart information presenter 129 may return multiple matching locations for a given bundle of session information. For example, based on comparisons to knowledge base 127, multiple matching locations may be determined, and a similarity rating may be determined for each match. Thus, smart information presenter could, for example, return multiple locations, each with a similarity rating. Then, the multiple locations could be ranked from most similar to less similar, for example.

Figure 2:
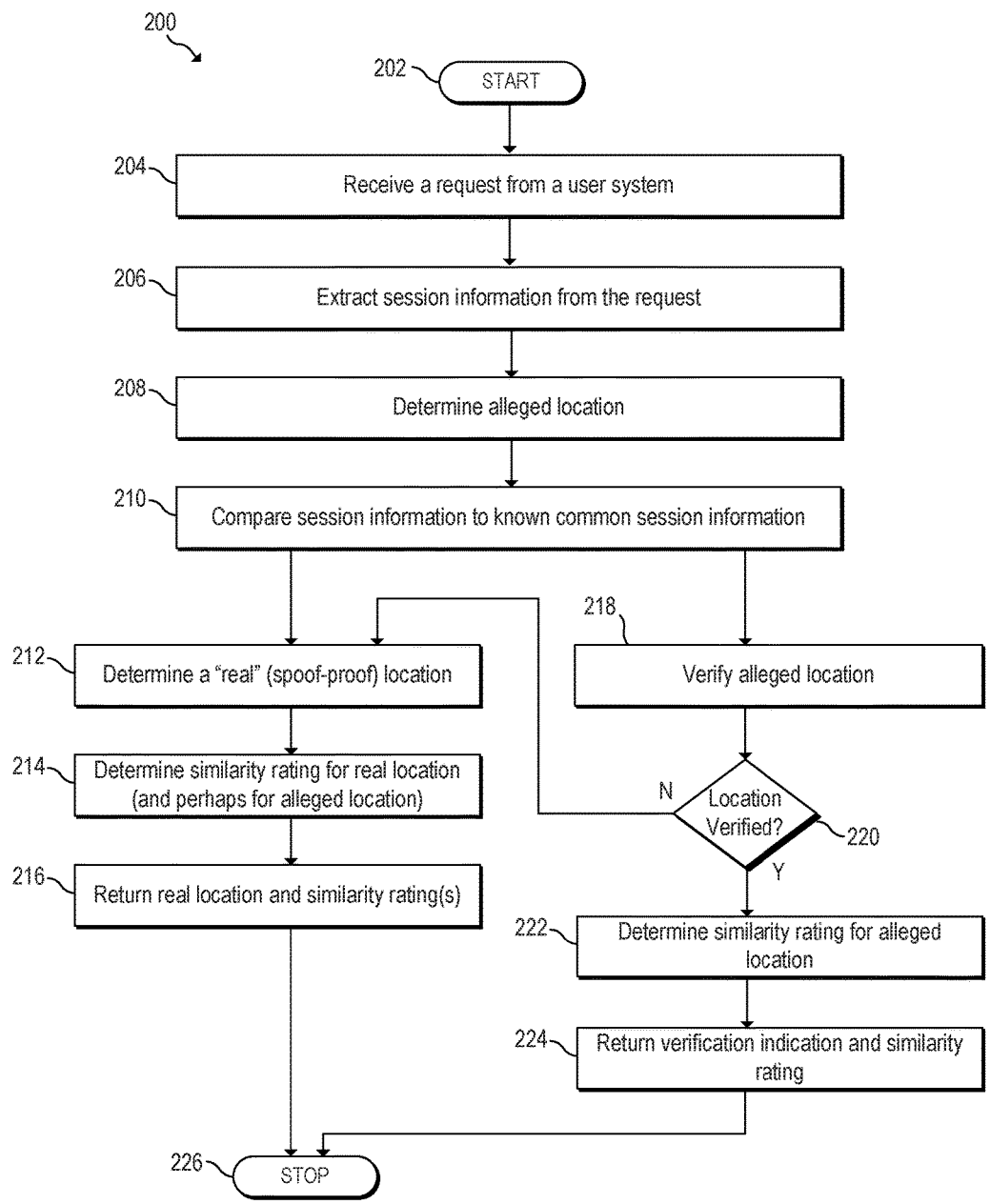
FIG. 2 is a flowchart of an example method for smart location determination.

FIG. 2 is a flowchart of an example method 200 for smart location determination. Method 200 may be described below as being executed or performed by at least one system, for example, system 110 of FIG. 1 and/or system 120 of FIG. 1. Other suitable systems and/or computing devices may be used as well. Method 200 may be implemented in the form of executable instructions stored on at least one machine-readable storage medium of at least one of the systems and executed by at least one processor of at least one of the systems. Alternatively or in addition, method 200 may be implemented in the form of electronic circuitry (e.g., hardware). In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and continue to step 204, where a first system (e.g., system 110 of FIG. 1) may receive a request from a user system (e.g., 102). At step 206, the first system may extract (e.g., via session information extractor 114) session information from the request, as described in more detail above. At step 208, either the first system or a second system may determine an alleged location, e.g., based on an alleged IP address associated with the request. At step 210, the second system (e.g., system 120 of FIG. 1), which may be the same as the first system in some examples, may compare (e.g., via session information comparator) the extracted session information with known common session information (e.g., stored in knowledge base 127). At step 212, the second system, based on the comparison may determine a "real" (spoof-proof) location, as described in more detail above. At step 214, the second system may determine (e.g., via similarity determinor 128) a similarity rating between the extracted session information and the real location, as described in more detail above. Also at step 214, the second system may determine a similarity rating between the extracted session information and the alleged location. At step 216, the second system may return (e.g., via smart information presenter 129) the real location and the similarity rating(s).

Referring again to step 210, as an alternate example or in conjunction with step 212, method 200 may proceed to step 218 where the second system may verify the alleged location, as described in more detail above. At step 220, if the alleged location is not verified, method 200 may proceed to step 212. Additionally, at step 220, if the alleged location or alleged associated IP address is known to be a proxy, as described above, method 200 may proceed to step 212. At step 220, if the alleged location is verified, method 200 may proceed to step 222 where the second system may determine (e.g., via similarity determinor 128) a similarity rating between the extracted session information and the alleged location. At step 224, the second system may return (e.g., via smart information presenter 129) an indication of the verification (of the alleged location) and the associated similarity rating. Method 200 may eventually continue to step 226, where method 200 may stop.

Figure 3:
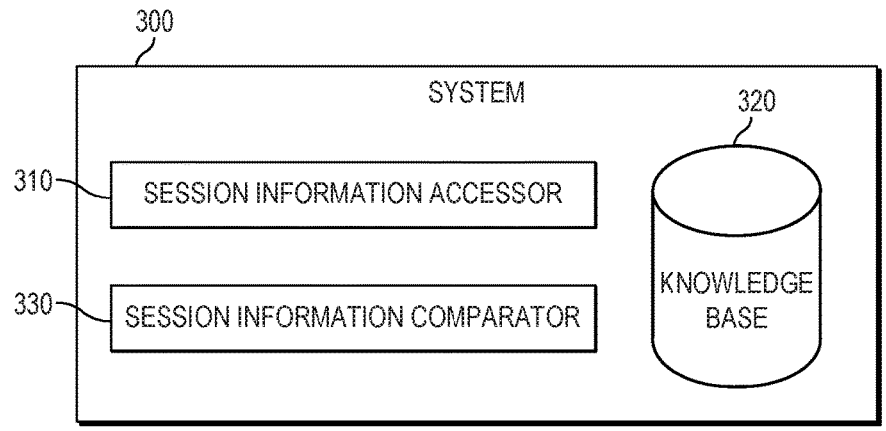
FIG. 3 is a block diagram of an example system for smart location determination.

FIG. 3 is a block diagram of an example system 300 for smart location determination. System 300 may include at least one computing device that is capable of communicating with at least one remote system. System 300 may be similar to system 120 of FIG. 1, for example. In the embodiment of FIG. 3, system 300 includes a session information accessor 310, a knowledge base 320 and a session information comparator 330. Session information accessor 310 may be similar to session information accessor 122, for example. Session information accessor 310 may access session information that details a session of a user system (e.g., 102) as it connects to a web technology server (e.g., 112). Session information accessor 310 may be implemented in the form of executable instructions stored on at least one machine-readable storage medium of system 300 and executed by at least one processor of system 300. Alternatively or in addition, session information accessor 310 may be implemented in the form of one or more hardware devices including electronic circuitry for implementing the functionality of session information accessor 310.

Knowledge base 320 may be similar to knowledge base 127, for example. Knowledge base 320 may include known common session information of multiple geographic locations. Knowledge base 320 may be a data store that may store digital information. Knowledge base 320 may include or be in communication with at least one physical storage mechanism (e.g., hard drive, solid state drive, tap drive or the like) capable of storing information including, for example, a digital database, a file capable of storing text, media, code, settings, other data or the like, or other type of data store. Knowledge base 320 may also include executable instructions stored on at least one machine-readable storage medium of system 300 and executed by at least one processor of system 300. Alternatively or in addition, knowledge base 320 may include one or more hardware devices including electronic circuitry for implementing the functionality of the knowledge base (e.g., responding to requests for information, performing lookups, returning data, etc.).

Session information comparator 330 may be similar to session information comparator 126, for example. Session information comparator 330 may compare the accessed session information to the knowledge base, and based on the comparison, determine a geographic location of the user system or verify an alleged geographic location. Session information comparator 330 may be implemented in the form of executable instructions stored on at least one machine-readable storage medium of system 300 and executed by at least one processor of system 300. Alternatively or in addition, session information comparator 330 may be implemented in the form of one or more hardware devices including electronic circuitry for implementing the functionality of session information comparator 330.

Figure 4:
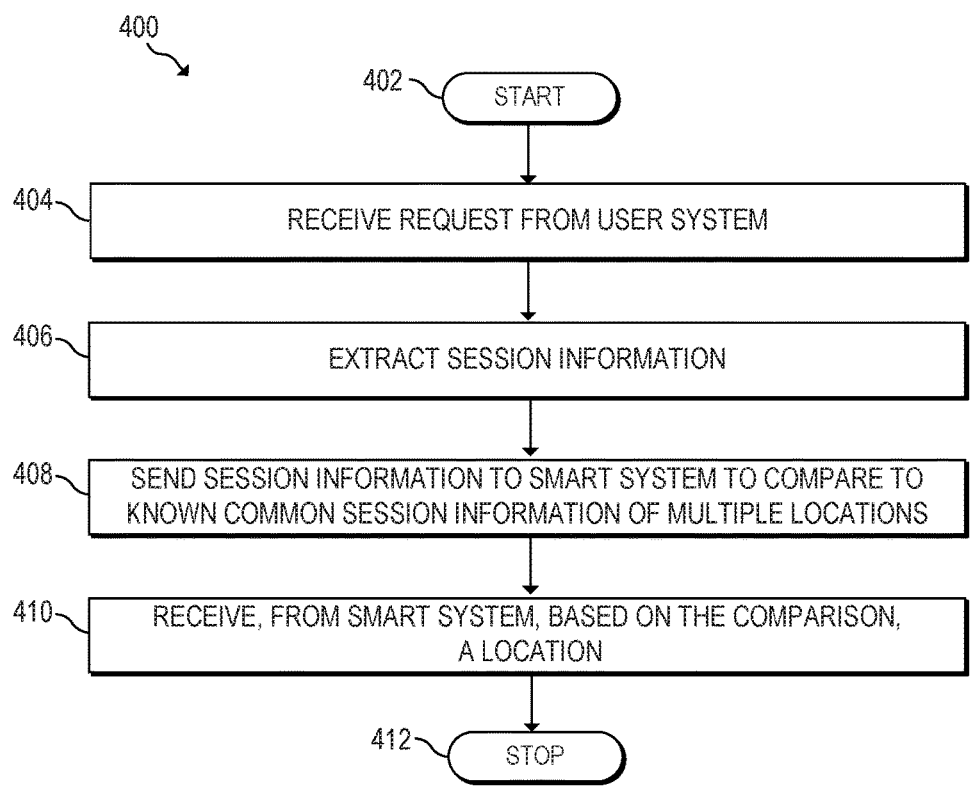
FIG. 4 is a flowchart of an example method for smart location determination.

FIG. 4 is a flowchart of an example method 400 for smart location determination. Method 400 may be described below as being executed or performed by a system, for example, system 110 of FIG. 1. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may receive a request from a user system to access a web technology. At step 406, the system may extract session information from the request that details a session of the user system as it sends the request. At step 408, the system may send the session information to a smart system to compare the session information to known common session information of multiple geographic locations. At step 410, the system may receive, from the smart system, based on the comparison, a geographic location of the user system or a verification of an alleged geographic location. Method 400 may eventually continue to step 412, where method 400 may stop.

Figure 5:
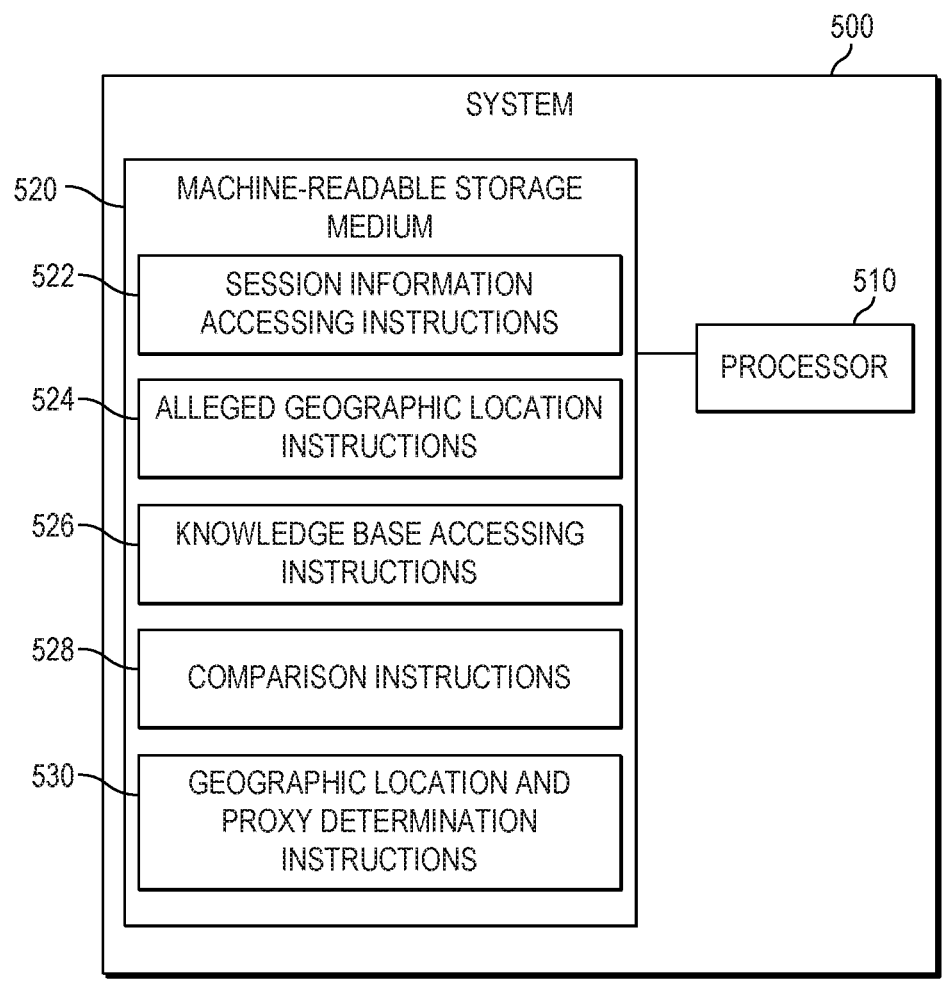
FIG. 5 is a block diagram of an example system for smart location determination.

FIG. 5 is a block diagram of an example system 500 for smart location determination. System 500 may include at least one computing device that is capable of communicating with at least one remote system. System 500 may be similar to system 120 of FIG. 1 or system 300 of FIG. 3, for example. In the embodiment of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528, 530 to perform smart location determination. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for smart location determination.

Referring to FIG. 5, session information accessing instructions 522, when executed by a processor (e.g., 510), may cause system 500 to access session information that details a session of a user system as it connects to a web technology server. Alleged geographic location instructions 524, when executed by a processor (e.g., 510), may cause system 500 to access or determine an alleged geographic location related to an alleged IP address of the user system. Knowledge base accessing instructions 526, when executed by a processor (e.g., 510), may cause system 500 to access a knowledge base that includes known common session information of multiple geographic locations. Comparison instructions 528, when executed by a processor (e.g., 510), may cause system 500 to compare the accessed session information to the knowledge base, and based on the comparison, determine a geographic location of the user system. Geographic location and proxy determination instructions 530, when executed by a processor (e.g., 510), may cause system 500 to determine that the geographic location is different than the alleged geographic location, and based on this, determine that a proxy was used to generate the alleged IP address.

The invention claimed is:

1. A system comprising: a processor; and a memory to store instructions that, when executed by the processor, cause the processor to: access session information that details a session of a user system as the user system connects to a web technology server, wherein the session information comprises data representing a version of software executing on the user system; and compare the accessed session information to a knowledge base that includes known common session information of multiple geographic locations, and based on the comparison determine a geographic location of the user system or verify an alleged geographic location; wherein if the geographic location of the user system is determined based on the comparison, the instructions when executed by the processor, cause the processor to determine a first similarity rating between common session information of the determined geographic location and the accessed session information, and the determined geographical location comprises one of the multiple geographical locations; wherein if the alleged geographic location is verified, the instructions when executed by the processor, cause the processor to determine a second similarity rating between common session information of the alleged geographic location and the accessed session information, and the alleged geographical location comprises one of the multiple geographical locations.

2. The system of claim 1, wherein the determination of the geographic location includes determining which of the multiple geographic locations has associated common session information in the knowledge base that best matches the accessed session information.

3. The system of claim 1, wherein the session information used for the comparison does not include an IP (internet protocol) address.

4. The system of claim 1, wherein the accessed session information includes multiple session parameters, and wherein the accessed session information comprises a plurality of different importance ratings for the multiple session parameters.

5. The system of claim 4, wherein the comparison of the accessed session information to the knowledge base includes considering the importance ratings.

6. The system of claim 1, wherein the version of software comprises a version of a browser of the user system, and the instructions, when executed by the processor, cause the processor to determine the geographic location of the user system or verify the alleged geographic location based on the version of the browser.

7. The system of claim 1, wherein the version of software comprises a version of an operating system of the user system, and the instructions, when executed by the processor, cause the processor to determine the geographic location of the user system or verify the alleged geographic location based on the version of the operating system.

8. The system of claim 1, wherein the session information comprises data identifying a major web browser version and a minor web browser version, and the instructions, when executed by the processor, cause the processor to determine the geographic location of the user system or verify the alleged geographic location based on the major web browser version and the minor web browser version.

9. The system of claim 1, wherein the session information comprises a language setting of the user system, and the instructions, when executed by the processor, cause the processor to determine the geographic location of the user system or verify the alleged geographic location based on the language setting.

10. The system of claim 1, wherein the session information comprises data identifying a plugin of a web browser of the user system, and the instructions, when executed by the processor, cause the processor to determine the geographic location of the user system or verify the alleged geographic location based on the identification of the plugin.

11. A method comprising: receiving a request from a user system to access a web technology; extracting session information from the request that details a session of the user system as it sends the request, wherein extracting the session information comprises extracting data identifying a language setting of the user system; sending the session information to a smart system to compare the session information to known common session information of multiple geographic locations; receiving, from the smart system, based on the comparison, a geographic location of the user system or a verification of an alleged geographic location; if the geographic location of the user system is received, receiving a first similarity rating based on the common session information of the determined geographic location and the accessed session information, wherein the determined geographical location comprises one of the multiple geographical locations; and if the alleged geographic location is received, receiving a second similarity rating based on common session information of the alleged geographic location and the accessed session information, wherein the alleged geographical location comprises one of the multiple geographical locations.

12. The method of claim 11, wherein the session information does not include an IP (internet protocol) address, and wherein the received geographic location is not based on an IP address.

13. The method of claim 11, wherein the request is a web browser request, and wherein the session information is extracted from a user agent string of the web browser request.

14. The method of claim 13, wherein the session information includes both system information of the user system and web browser information of the requesting web browser.

15. The method of claim 11, wherein the session information includes multiple session parameters, and wherein the sending of the session information includes sending an importance rating for at least one of the session parameters.

16. A machine-readable storage medium encoded with instructions executable by a processor of a system to cause the system to: access session information that details a session of a user system as it connects to a web technology server, wherein the session information comprises data identifying a version of software executing on the user system; access or determine an allege geographic location related to an alleged IP address of the user system; access a knowledge base that includes known common session information of multiple geographic locations; compare the accessed session information to the knowledge base, and based on the comparison, determine a geographic location of the user system and determine a similarity rating between common session information of the geographic location and the accessed session information; and determine that the geographic location is different than the alleged geographic location, and based on the determination that the geographic location is different, determine that a proxy was used to generate the alleged IP address.

17. A machine-readable storage medium of claim 16, wherein the determination that a proxy was used is further based on previous analysis of other session information for other sessions where it was determined for those sessions that the determined geographic location was different than the alleged geographic location.

* * * * *